US012758052B2

(12) United States Patent
Kim et al.

(10) Patent No.: US 12,758,052 B2
(45) Date of Patent: Oct. 13, 2026

(54) LIQUID BREWING DEVICE

(71) Applicant: IB APPLIANCES US HOLDINGS LLC, Downers Grove, IL (US)

(72) Inventors: Chunshik Kim, San Jose, CA (US); Tyler Brunner, Durand, WI (US); Daniel M. Wodka, Riverside, IL (US)

(73) Assignee: IB APPLIANCES US HOLDINGS, LLC, Chicago, IL (US)

( * ) Notice: Subject to any disclaimer, the term of this patent is extended or adjusted under 35 U.S.C. 154(b) by 1150 days.

(21) Appl. No.: 17/845,226

(22) Filed: Jun. 21, 2022

(65) Prior Publication Data

US 2023/0000287 A1 Jan. 5, 2023

Related U.S. Application Data

(60) Provisional application No. 63/288,223, filed on Dec. 10, 2021, provisional application No. 63/218,173, filed on Jul. 2, 2021.

(51) Int. Cl.

*A47J 43/046* (2006.01)
*A47J 31/02* (2006.01)
*A47J 31/44* (2006.01)

(52) U.S. Cl.

CPC ........... *A47J 43/0465* (2013.01); *A47J 31/02* (2013.01); *A47J 31/44* (2013.01)

(58) Field of Classification Search

CPC ........ A47J 43/0465; A47J 31/02; A47J 31/44; A47J 31/18; A47J 43/046; A47J 43/0716;

(Continued)

(56) References Cited

U.S. PATENT DOCUMENTS 2,350,534 A 6/1944 Rosinger
2,835,188 A * 5/1958 Graham .............. A47J 31/0615 99/322

(Continued)

FOREIGN PATENT DOCUMENTS

CN 2887205 Y 4/2007
CN 101601546 A 12/2009

(Continued)

OTHER PUBLICATIONS

Amazon webpage, County Line Mason Jar Coffee Maker—$29.95, Date of First Availabilit: Jul. 22, 2019. 1 pg.

(Continued)

*Primary Examiner* — Edward F Landrum
(74) *Attorney, Agent, or Firm* — Crowell & Moring LLP

(57) ABSTRACT

A liquid brewing device includes a base housing a motor and at least one base magnet rotatable by the motor relative to the base, a pitcher having an interior volume, and a brew basket for receiving brewing ingredients, the brew basket being removably insertable positioned in the interior volume of the pitcher. An agitator is positioned entirely within and rotatable relative to the brew basket, the agitator being operatively coupled to at least one agitator magnet. The at least one agitator magnet is magnetically coupled to the at least one base magnet, such that rotation of the at least one base magnet by the motor operates to rotate the at least one agitator magnet and the agitator.

19 Claims, 14 Drawing Sheets

(58) Field of Classification Search
CPC .... A47J 43/0722; A47J 43/085; H02K 41/03; H02K 41/031; H02K 41/033; H02K 49/104; H02K 49/108
USPC ........................................................ 99/287
See application file for complete search history.

(56) References Cited

U.S. PATENT DOCUMENTS 3,654,852 A * 4/1972 Rosan, Sr. ......... B01D 11/0257 99/323
3,693,941 A 9/1972 Suchy
4,162,855 A 7/1979 Bender
4,401,014 A * 8/1983 McGrail ................ A47J 31/20 99/320
5,463,932 A 11/1995 Olson
5,865,095 A 2/1999 Mulle
6,817,279 B2 11/2004 Leung et al.
6,968,775 B2 11/2005 Burrows et al.
7,017,473 B2 3/2006 Mazzola, Jr. et al.
7,240,611 B2 7/2007 Burrows et al.
7,357,567 B2 4/2008 Terentiev
7,673,555 B2 3/2010 Nosler et al.
7,858,133 B2 12/2010 Neace, Jr. et al.
8,371,211 B2 2/2013 Nosler et al.
8,383,180 B2 2/2013 Vastardis
8,573,115 B2 11/2013 Lai et al.
8,586,117 B2 11/2013 Vastardis et al.
8,621,982 B2 1/2014 Nosler et al.
8,646,379 B2 2/2014 Lai et al.
8,720,321 B2 5/2014 Neace, Jr. et al.
8,734,885 B2 5/2014 Sweeney
8,794,127 B2 8/2014 Nosler et al.
8,950,315 B2 2/2015 Lai et al.
8,970,174 B2 3/2015 Nakayama et al.
8,978,541 B2 3/2015 Lai et al.
RE45,476 E 4/2015 Burrows et al.
9,066,623 B2 6/2015 Lai et al.
9,154,547 B2 10/2015 Kuempel et al.
9,155,418 B2 10/2015 Lai et al.
9,179,798 B2 11/2015 Albanese
9,295,358 B2 3/2016 Vastardis et al.
9,307,860 B2 4/2016 Burrows
9,357,874 B2 6/2016 Licare
9,402,405 B2 8/2016 Vastardis et al.
9,402,406 B2 8/2016 Nosler et al.
9,591,862 B2 3/2017 Kuempel et al.
9,713,399 B2 7/2017 Boone et al.
9,763,461 B2 9/2017 Vastardis et al.
9,795,246 B1 10/2017 Bellman et al.
9,846,201 B2 12/2017 Nakayama et al.
9,867,494 B2 1/2018 Frazer
9,907,427 B2 3/2018 Germain et al.
9,907,430 B2 3/2018 Vastardis et al.
9,924,827 B2 3/2018 Simpson
9,968,218 B2 5/2018 Burrows
9,999,314 B1 6/2018 Neace et al.
10,004,354 B2 6/2018 Leung et al.
10,045,654 B2 8/2018 Burrows
10,051,989 B2 8/2018 Nakao et al.
10,080,460 B2 9/2018 Nakao et al.
10,104,900 B2 10/2018 Paul
10,117,444 B2 11/2018 Vastardis et al.
10,231,566 B2 3/2019 Neace, Jr. et al.
10,251,507 B2 4/2019 Simpson
10,278,533 B2 5/2019 Angell et al.
10,301,165 B2 5/2019 Leyva et al.
10,362,894 B2 7/2019 Fain
10,376,094 B1 * 8/2019 Pfeifer ................ A47J 43/0465
10,401,317 B2 9/2019 Scaboo et al.
10,470,601 B2 11/2019 Lin
10,478,011 B2 11/2019 Truninger et al.
10,492,509 B2 12/2019 Pabst et al.
10,517,421 B2 12/2019 Habram
10,517,438 B2 12/2019 Walker
10,537,200 B2 1/2020 Ait Bouziad et al.
10,542,839 B2 1/2020 Leung et al.
10,667,642 B2 6/2020 Nosler et al.
10,716,430 B2 7/2020 Burrows
10,729,153 B2 8/2020 Jacobs
10,729,277 B2 8/2020 Jacobs
10,744,470 B2 8/2020 Lee
10,750,899 B2 8/2020 Chung et al.
10,758,078 B2 9/2020 Bellman et al.
10,827,874 B2 11/2020 Moon et al.
10,849,453 B2 12/2020 Moon et al.
10,874,246 B2 12/2020 Burrows
10,881,241 B2 1/2021 Burrows
10,966,561 B2 4/2021 Boone et al.
11,311,023 B2 4/2022 Anthony et al.
2002/0145940 A1 * 10/2002 Terentiev ............ H02K 49/106 366/273
2006/0016346 A1 1/2006 Mulle et al.
2006/0191420 A1 8/2006 Mazzola, Jr. et al.
2007/0119308 A1 5/2007 Glucksman et al.
2009/0031900 A1 2/2009 Barraclough et al.
2009/0317526 A1 12/2009 Tacklind et al.
2010/0024657 A9 2/2010 Nosler et al.
2011/0297004 A1 12/2011 Figura
2013/0133521 A1 5/2013 Vastardis
2014/0079855 A1 3/2014 Yokoo et al.
2014/0170280 A1 6/2014 St. Germain et al.
2015/0327718 A1 11/2015 Burrows
2015/0359380 A1 12/2015 Oleksy
2015/0366234 A1 12/2015 Kuempel et al.
2016/0095466 A1 4/2016 Hsu
2016/0174755 A1 6/2016 Burrows
2016/0270587 A1 9/2016 Yu et al.
2016/0338527 A1 11/2016 Burrows
2016/0353919 A1 12/2016 Burrows
2016/0360919 A1 12/2016 Burrows
2017/0027367 A1 2/2017 Burrows
2017/0055760 A1 3/2017 Burrows
2017/0119195 A1 5/2017 Al-Shaibani et al.
2017/0172338 A1 6/2017 Burrows
2017/0215627 A1 8/2017 Fung
2017/0273496 A1 9/2017 Kitatani et al.
2017/0295989 A1 10/2017 Burrows
2017/0295992 A1 10/2017 Mangold et al.
2018/0100897 A1 4/2018 Nakayama et al.
2018/0192815 A1 7/2018 Vastardis et al.
2018/0216875 A1 8/2018 Caswell et al.
2018/0220832 A1 8/2018 Psarologos et al.
2018/0220836 A1 8/2018 Bellman et al.
2019/0059409 A1 2/2019 Vastardis et al.
2019/0090503 A1 3/2019 Anthony et al.
2019/0142209 A1 5/2019 Bellman
2019/0200802 A1 7/2019 Moon et al.
2019/0208947 A1 7/2019 Neace, Jr. et al.
2019/0290048 A1 9/2019 Albanese
2019/0307285 A1 10/2019 Fain
2019/0387920 A1 12/2019 Anthony et al.
2020/0008611 A1 1/2020 Sjaastad et al.
2020/0015622 A1 1/2020 Trininger et al.
2020/0045989 A1 2/2020 Pabst et al.
2020/0054164 A1 2/2020 Moon et al.
2020/0093315 A1 3/2020 Burrows
2020/0113369 A1 4/2020 Bardot et al.
2020/0121115 A1 4/2020 Oh
2020/0154930 A1 5/2020 Rivera
2020/0170440 A1 6/2020 Vastardis
2020/0170442 A1 6/2020 Rivera
2020/0288901 A1 9/2020 De' Longhi et al.
2020/0297153 A1 9/2020 Jacobs
2020/0345171 A1 11/2020 Burrows
2020/0359829 A1 11/2020 Light
2020/0375390 A1 12/2020 Bellman et al.
2020/0397178 A1 12/2020 Psarologos et al.
2021/0052105 A1 2/2021 Bojie et al.
2021/0059463 A1 3/2021 Ellis et al.
2021/0093120 A1 4/2021 Palmer et al.
2021/0120999 A1 4/2021 Anthony et al.
2021/0137306 A1 5/2021 Rivera

(56) References Cited

U.S. PATENT DOCUMENTS

| | | | |
|---|---|---|---|
| 2021/0145202 A1 | 5/2021 | Al-Shaibani et al. | |
| 2021/0186251 A1 | 6/2021 | Boone et al. | |

FOREIGN PATENT DOCUMENTS

| | | | |
|---|---|---|---|
| CN | 101181134 | B | 7/2010 |
| CN | 102631151 | A | 8/2012 |
| CN | 202698862 | U | 1/2013 |
| CN | 102727098 | B | 2/2014 |
| CN | 204091744 | U | 1/2015 |
| CN | 204091752 | U | 1/2015 |
| CN | 204378955 | U | 6/2015 |
| CN | 105433808 | A | 3/2016 |
| CN | 103462498 | B | 4/2016 |
| CN | 104116409 | B | 6/2016 |
| CN | 205548335 | U | 9/2016 |
| CN | 106108653 | A | 11/2016 |
| CN | 104586267 | B | 2/2017 |
| CN | 205923755 | U | 2/2017 |
| CN | 205923757 | U | 2/2017 |
| CN | 206044377 | U | 3/2017 |
| CN | 106805774 | A | 6/2017 |
| CN | 107156361 | A | 9/2017 |
| CN | 107625426 | A | 1/2018 |
| CN | 106942998 | B | 2/2018 |
| CN | 206995092 | U | 2/2018 |
| CN | 105996768 | B | 8/2018 |
| CN | 108464695 | A | 8/2018 |
| CN | 109042937 | A | 12/2018 |
| CN | 109042939 | A | 12/2018 |
| CN | 109042977 | A | 12/2018 |
| CN | 208447251 | U | 2/2019 |
| CN | 208463689 | U | 2/2019 |
| CN | 109674350 | A | 4/2019 |
| CN | 208784468 | U | 4/2019 |
| CN | 208909812 | U | 5/2019 |
| CN | 110051108 | A | 7/2019 |
| CN | 209091002 | U | 7/2019 |
| CN | 110178950 | A | 8/2019 |
| CN | 209235818 | U | 8/2019 |
| CN | 110477172 | A | 11/2019 |
| CN | 209574387 | U | 11/2019 |
| CN | 110558845 | A | 12/2019 |
| CN | 209750757 | U | 12/2019 |
| CN | 110960093 | A | 4/2020 |
| CN | 111053441 | A | 4/2020 |
| CN | 210300673 | U | 4/2020 |
| CN | 210383648 | U | 4/2020 |
| CN | 111134536 | A | 5/2020 |
| CN | 210930902 | U | 7/2020 |
| CN | 211022239 | U | 7/2020 |
| CN | 111493664 | A | 8/2020 |
| CN | 211270093 | U | 8/2020 |
| CN | 211270094 | U | 8/2020 |
| CN | 111839275 | A | 10/2020 |
| CN | 211632835 | U | 10/2020 |
| CN | 211632836 | U | 10/2020 |
| CN | 107569130 | B | 11/2020 |
| CN | 111990886 | A | 11/2020 |
| CN | 112021937 | A | 12/2020 |
| CN | 212489583 | U | 2/2021 |
| CN | 113133690 | A | 7/2021 |
| DE | 4201693 | C1 | 4/1993 |
| EP | 3143913 | B1 | 6/2019 |
| EP | 3437526 | B1 | 5/2020 |
| EP | 3446600 | B1 | 8/2020 |
| EP | 3747273 | A1 | 12/2020 |
| EP | 3808185 | A1 | 4/2021 |
| WO | WO 2016/058250 | A1 | 4/2016 |
| WO | WO 2019/013858 | A1 | 1/2019 |
| WO | WO 2019/021051 | A1 | 1/2019 |
| WO | WO 2019/075590 | A1 | 4/2019 |
| WO | WO 2020/052348 | A1 | 3/2020 |
| WO | WO 2020/115185 | A3 | 8/2020 |
| WO | WO 2020/154986 | A1 | 8/2020 |
| WO | WO 2020/159458 | A3 | 8/2020 |
| WO | WO 2020/181212 | A1 | 9/2020 |
| WO | WO 2020/187162 | A1 | 9/2020 |
| WO | WO 2020/215541 | A1 | 10/2020 |

OTHER PUBLICATIONS

Amazon webpage, Toddy Cold Brew System—$34.95, Date of First Availability: May 5, 2003, 1 pg.

Amazon webgage, OXO 32oz Cold Brew Maker—$49.95, 1 pg.

Amazon webpage, Asobu Coldbrew Portable—$38.99, Date of First Availability: Sep. 25, 2017, 1 pg.

Amazon webpage, Cold Bruer Drip Coffee Maker—$79.95, Date of First Availability: Jan. 23, 2017, 1 pg.

Amazon webpage, Cuisinart DBC-10 Automatic Cold Brew—$79.85, Date of First Availability: Jul. 6, 2017, 1 pg.

Amazon webpage, Presto 02937 Dorothy Electric Rapid Cold Brew—$69.99 ($49.99), Date of First Availability: May 29, 2020, 1 pg.

Amazon webpage, Vinci Express Cold Brew Electric 1.1L—$79.99 ($69.99), Date of First Availability: Feb. 8, 2020, 1 pg.

Amazon webpage, Gourmia GCM6850 Automatic Cold Brew—$67.99, Date of First Availability: Jun. 12, 2018, 1 pg.

Amazon webpage, Dash DCBCM550BK Cold Brew—$69.99, 1 pg.

Webgage, ETI Fast Cold Brew—377101A, 1 pg.

Amazon webpage, Ninja Hot and "Cold" Brewed System, Date of First Availability: Aug. 1, 2018, 1 pg.

* cited by examiner

| Step | Phase | Function | Motor Status | Motor Power or Speed | Run Time (s) |
|---|---|---|---|---|---|
| 601 | 1 | Mix & Wet Brewing Ingredients | On | *x* | 5 |
| 602 | 2 | Dwell & Soak | Off | 0 | 20 |
| 603 | 3 | Mix & Wet Brewing Ingredients | On | 0.75*x* | 5 |
| 604 | 4 | Dwell & Soak | Off | 0 | 20 |
| 605 | 5 | Mix & Wet Brewing Ingredients | On | 0.75*x* | 5 |
| 606 | 6 | Dwell & Soak | Off | 0 | 49 |
| 607 | 7 | Reconstitute Mixture | On | 0.40*x* | 11 |
| Repeat Phases 6 and 7 *n* times until Brewing Concludes | | Dwell & Soak | Off | 0 | 49 |
| | | Reconstitute Mixture | On | 0.40*x* | 11 |

LIQUID BREWING DEVICE

RELATED APPLICATIONS

This application claims the benefit of U.S. Provisional Application No. 63/218,173, filed on Jul. 2, 2021, and U.S. Provisional Application No. 63/288,223, filed on Dec. 10, 2021, the entireties of which are incorporated herein by reference.

TECHNICAL FIELD

The present disclosure relates to liquid brewing devices, and in particular, to a magnetically agitated countertop device.

BACKGROUND

Existing liquid brewing devices suffer from a number of drawbacks. For example, they may be difficult to clean, take too long to brew, and may be challenging to calibrate according to the extraction level of a user's taste preferences. Such challenges may make liquid brewing a difficult task.

It is an object of the present disclosure to provide a liquid brewing device that can make a variety of strengths of liquid brew quickly, using a magnetic agitation method, and providing a user the ability to monitor the look and taste of the liquid during brewing, and perform additional brewing and/or agitation according to preference. Additionally, because the parts to this machine are easily separated, they are easier to clean and maintain over time.

SUMMARY

In one embodiment, a liquid brewing device includes a powered base having at least one base magnet rotatable relative to the powered base and a motor configured to rotate the at least one base magnet, a pitcher having an interior volume, a brew basket for receiving brewing ingredients and insertion in the interior volume; and an agitator positioned in and rotatable relative to the brew basket. The agitator is operatively connected (e.g., via magnetic communication) to at least one agitator magnet in communication with the at least one base magnet. The agitator may be positioned entirely within the brew basket.

In one aspect, a cap may be removably attachable to a lower end of the brew basket, for example, via a threaded engagement, a snap-fit, or a compression fit. The cap may be formed of metal. The cap may include at least one drainage port. The cap may include a mesh structure. The cap may include a post on which the agitator is rotatably mounted. The cap and the agitator may have mating geometrical shapes to connect the cap and the agitator.

In another aspect, the brew basket may comprise a mesh structure. An inner surface of the brew basket may comprises mixing protrusions extending into an interior of the brew basket. A cross-section of the brew basket may be circular, square, rectangular, triangular, or polygonal.

In another aspect, the agitator may include at least one vane or blade. The at least one vane or blade may extend from an inner radius of the agitator, spaced from a central axis of the agitator, to an outer radius at a periphery of the agitator. The agitator may comprise a whisk. The agitator may be disc shaped or cone-shaped.

In another aspect, when the brew basket and the cap are inserted in the interior volume of the pitcher, the cap may be positioned at a bottom of the pitcher. In some embodiments, the cap may contact a bottom of the pitcher.

In another aspect, the powered base includes a depression shaped to receive the pitcher. The powered base may include a surface on which the pitcher sits such that the at least one base magnet is positioned adjacent the surface. The powered base may include a user interface angled relative to a lower surface of the powered base, to improve visibility of the user interface by a user standing in front thereof.

In another aspect, the pitcher is made of glass or a transparent material. The pitcher may include an outlet for pouring liquid from the interior volume, the outlet being positioned outside of the brew basket.

In another aspect, the at least one agitator magnet may be mounted to an agitator magnet housing. The agitator magnet housing may be rotatably mounted on a stationary post extending into the brew basket. The agitator magnet housing may be positioned in the brew basket. The agitator magnet housing may include at least one surface feature disposed on a lower surface of the agitator magnet housing. The at least one surface feature may include at least one of a channel, a groove, a rib, or a fin.

In another aspect, one of the at least one base magnets may have the same polarity orientation as one of the at least one agitator magnets. Each of the at least one base magnets may have the same polarity orientations as each of the at least one agitator magnets.

In another aspect, a plurality of base magnets may have at least one positive polarity base magnet orientation and at least one negative polarity base magnet orientation. A plurality of agitator magnets may have at least one positive polarity agitator magnet orientation and at least one negative polarity agitator magnet orientation.

In another aspect, a plurality of base magnets may have at least one base magnet with a first polarity orientation positioned adjacent to two base magnets with a second polarity orientation opposite the first polarity orientation. A plurality of agitator magnets may have at least one agitator magnet with a first polarity orientation positioned adjacent to two agitator magnets with a second polarity orientation opposite the first polarity.

In another aspect, a lid may be removably connectable to the pitcher, the removable lid portion and the brew basket being separable from the lid. The brew basket may be removably connectable to the removeable lid portion. An annular seal may be disposed between the lid and the removable lid portion. The annular seal may be a wipe seal.

In another aspect, the a motor load sensor or circuitry may detect a load on the motor during operation. Additionally, a controller may be configured to execute one or more brewing programs stored in a memory.

In some embodiments, a liquid brewing device may include any one or more of the features disclosed above.

A method for liquid brewing includes providing a powered base with at least one rotatable base magnet, inserting brewing ingredients into a brew basket having an agitator located in a lower portion of the brew basket, the agitator operatively connected to at least one agitator magnet positioned in the brew basket (e.g., via magnetic communication), inserting the brew basket into a pitcher, adding a liquid to the pitcher, placing the pitcher onto the powered base, and rotating the agitator by rotating the base magnets in the powered base.

In one aspect, the method includes removing the pitcher from the powered base while the agitator and brew basket remain in the pitcher.

In another aspect, the method includes removing the pitcher from the powered base while the agitator remains in the brew basket.

In another aspect, the method includes observing the brew saturation of the liquid or tasting the liquid, and returning the pitcher to the powered base and resuming agitation.

In another aspect, the method includes controlling the agitation via a user interface.

In another aspect, tasting the liquid further includes passing the liquid through a mesh structure of the brew basket prior to tasting the liquid.

In another aspect, the method includes removing the brew basket from the pitcher, removing a cap removably connected to a lower portion of the brew basket, and removing the agitator through a lower portion of the brew basket. The method may also include cleaning the pitcher, the brew basket, the cap, and the agitator.

In another aspect, the method includes adding ice to the pitcher in a volume outside the brew basket.

In another aspect, rotating the base magnets in the powered base includes supplying power to a motor.

In another aspect, the method may include a first brewing period, wherein a predetermined first level of power is supplied to the motor for a predetermined first amount time. The method may further include a second brewing period wherein a predetermined second level of power is supplied to the motor for a predetermined second amount of time. The predetermined second level of power may be zero, or the predetermined second level of power may be less than the predetermined first level of power. The predetermined second amount of time may be greater than the predetermined first amount of time.

In another aspect, the method may include a third brewing period wherein a predetermined third level of power is supplied to the motor for a predetermined third amount of time. The predetermined third level of power may be less than the predetermined first level of power, and greater than the predetermined second level of power. The predetermined third amount of time may be less than the predetermined second amount of time.

In another aspect, the method may include a fourth brewing period wherein a predetermined fourth level of power is supplied to the motor for a predetermined fourth amount of time. The predetermined fourth level of power may be zero, or the predetermined fourth level of power may be less than the predetermined first level of power. The predetermined fourth amount of time may be greater than the predetermined first amount of time.

In another aspect, the method may include a fifth brewing period wherein a predetermined fifth level of power is supplied to the motor for a predetermined fifth amount of time. The predetermined fifth level of power may be less than the predetermined third level power. The predetermined fifth amount of time may greater than the predetermined first amount of time.

In another aspect, the method may include receiving a user-inputted brewing time, rotating the agitator intermittently during one or more agitation periods within the user-inputted brewing time by rotating the base magnets in the powered base, and adjusting a rotating speed of the agitator during the one or more agitation periods. The method may further include adjusting the duration of one or more soaking periods separating the one or more agitation periods. The rotating speed of the of the agitator during the one or more soaking periods may be less than the rotating speed of the agitator during the one or more agitation periods. The rotating speed of the agitator during the one or more soaking periods may be zero.

In another aspect, the method may include detecting a resistance to rotation of the agitator, and adjusting a rotating speed of the agitator based on the detected resistance to rotation of the agitator. Detecting a resistance to rotation of the agitator may include detecting a load on a motor magnetically coupled to the agitator.

A method for liquid brewing may include any one or more of the steps above, using a liquid brewing device including any one or more of the features disclosed above.

BRIEF DESCRIPTION OF THE DRAWINGS

The embodiments can be better understood with reference to the following drawings and description. The components in the figures are not necessarily to scale, emphasis being placed upon illustrating the principles of the disclosure. Moreover, in the figures, like referenced numerals designate corresponding parts throughout the different view.

DESCRIPTION

Figure 1:
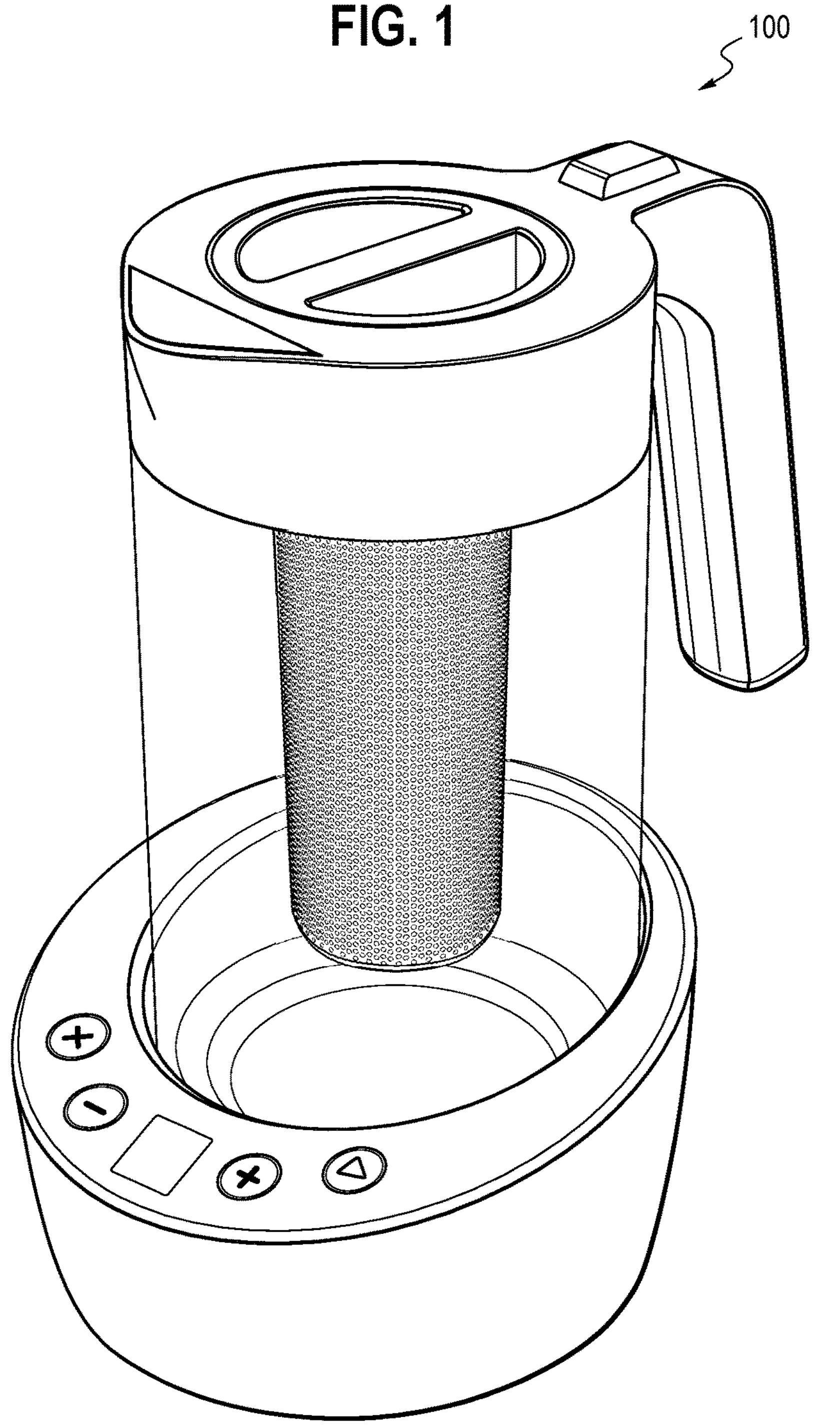
FIG. 1 is an illustration of one embodiment of a liquid brewing device according to the present disclosure.

FIG. 1 is an illustration of one embodiment of a liquid brewing device 100 according to the present disclosure. Although the liquid brewing device 100 may be scaled across a broad range of usage occasions and sizes, as illustrated, it is particularly suited for use as a countertop cold-brew coffee or tea brewer.

Traditionally, cold-brewing involves flavor extraction from brewing ingredients, without the use of a heating element. However, those skilled in the art that a heating element and/or pre-heated liquids may be added to the devices disclosed herein without departing from the scope of the disclosure.

Figure 2A:
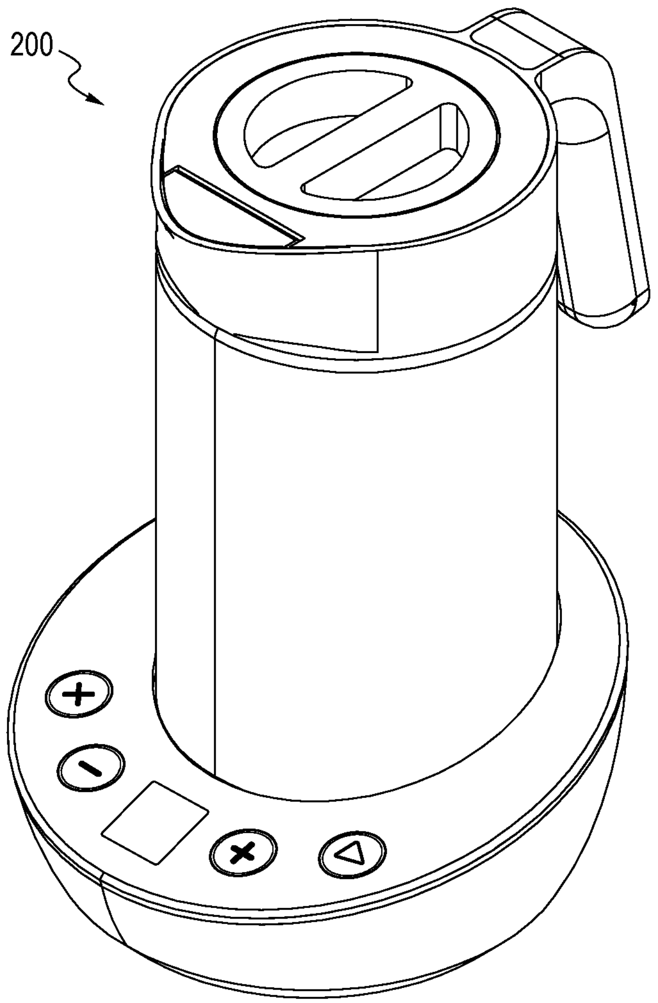
FIGS. 2A-B are illustrations of another embodiment of a liquid brewing device according to the present disclosure, including an exploded view of the brewing device's components.
Figure 2B:
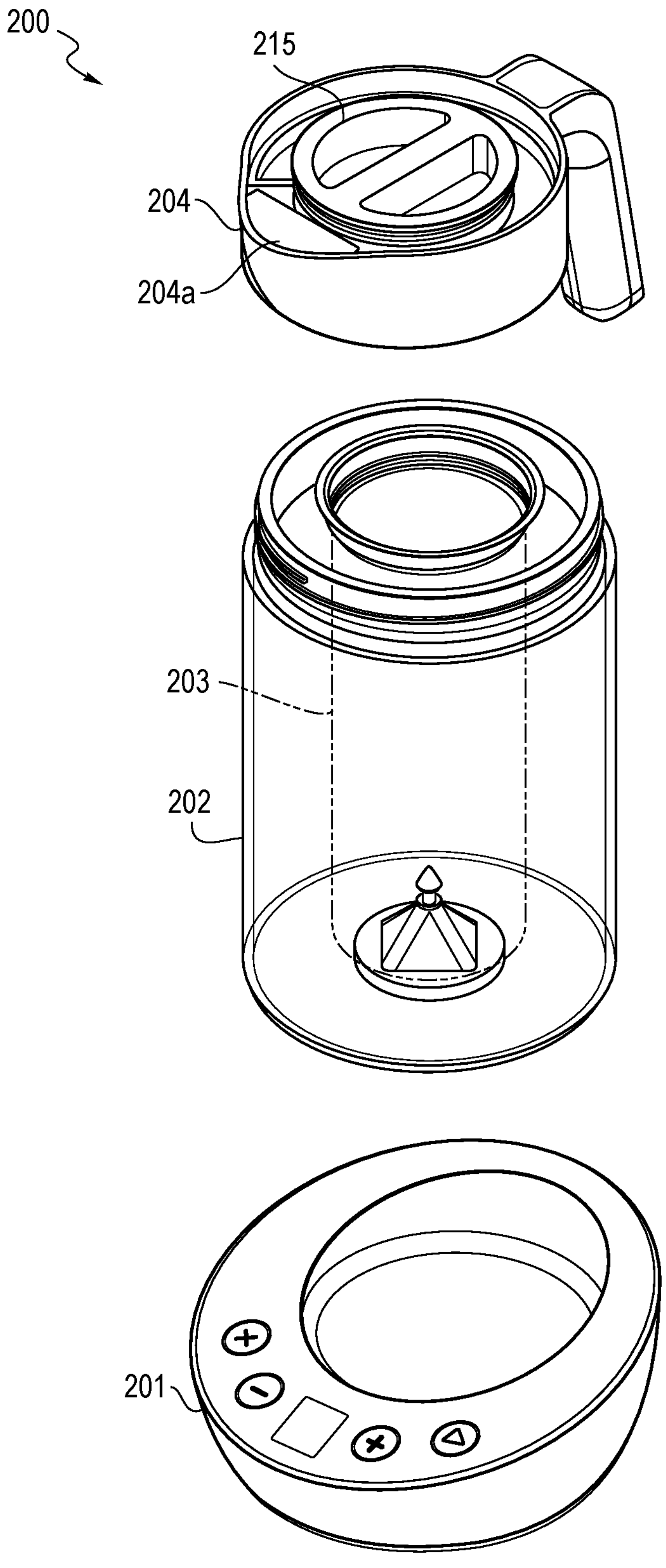

FIGS. 2A-B are illustrations of a second embodiment of a liquid brewing device 200 according to the present disclosure. In general, the liquid brewing device includes a base 201, a pitcher 202, a brew basket 203, and a lid 204 having an outlet 204*a*. In some embodiments, the pitcher 202 is formed of glass. Preferably, the base 201, the pitcher 202, the brew basket 203, and the lid 204 are separable for purposes of washing and/or cleaning each component. In some embodiments, the outlet 204*a* may have an inner flap. Although the base 201 as illustrated includes a depression shaped recess to receive the pitcher 202, in other embodiments, the base 201 may have a flat surface on which the pitcher 202 rests. The base 201 may include a user interface to assist the user with controlling the agitation time or method of the liquid brewing. The user interface may be angled relative to the base 201, or to the top of the device. This allows the user a clear view of the user interface while near the device, further promoting the device's ease of use.

Figure 3:
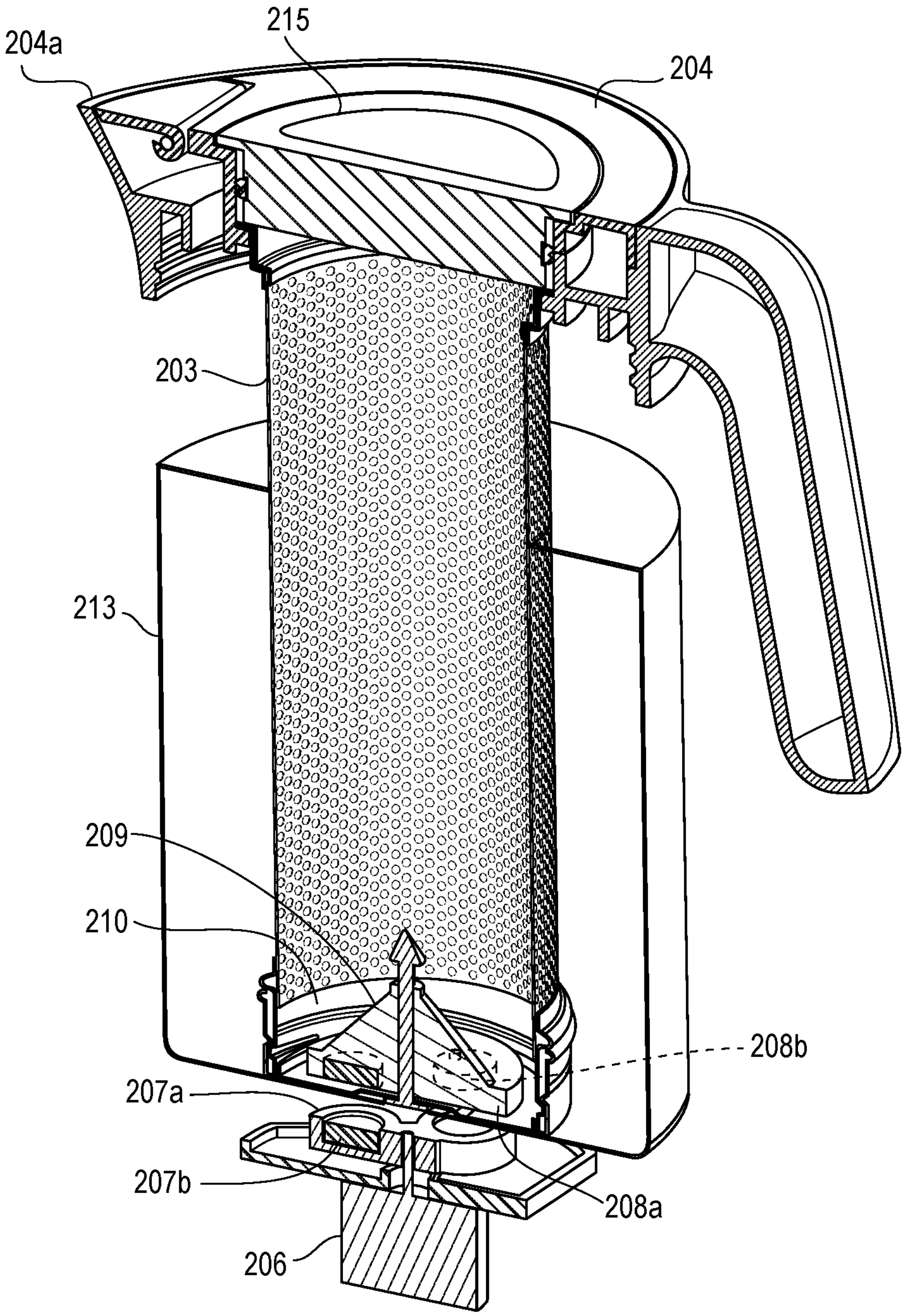
FIG. 3 is a cross-sectional view of the liquid brewing device of FIGS. 2A-B, absent the housing of the base, and the wall of the pitcher.

FIG. 3 is an illustration of a cross-sectional view of a liquid brewing device 200 according to the present disclosure, absent the housing of the base 201, and the wall of the pitcher 202. In general, the liquid brewing device includes a motor 206, a base magnet holder 207*a*, at least one base magnet 207*b*, an agitator magnet holder 208*a*, at least one agitator magnet 208*b*, an agitator 209, a lower cap 210, a brew basket 203, a potential liquid fill volume 213, and an outlet 204*a* associated with the pitcher. The motor 206, base magnet holder 207*a*, and base magnets 207*b* are housed in the base 201. The base magnet holder 207*a* and base magnets 207*b* are operatively coupled to the motor 206, such that the motor can selectively rotate the base magnet holder 207*a* and base magnets 207*b* using a user interface. The motor may be any suitable AC or DC motor, and may receive power from a standard electric cord connected to a wall outlet, or a battery housed in the base 202.

The lower cap 210 is removably attached to the brew basket 203, so that the lower end of the brew basket 203 may be selectively opened or closed, for example, to access and/or clean the interior of the brew basket 203, and the components positioned therein. Although the cap 210 as illustrated is connected via a threaded engagement to the brew basket 203, in other embodiments, the cap 210 may have a different connection mechanism, such as snap-fit or compression fit. Additionally, a sealing element may be disposed between the lower cap 210 and the brew basket 203, so as to ensure that any brewing ingredient within the brew basket 203 do not exit the brew basket 203 through the interface with the lower cap 210.

Although the brew basket 203 is illustrated as having a circular cross-sectional shape, in other embodiments, the brew basket 203 may have a different cross-sectional shape, such as a square, oval, rectangle, triangle, or other polygon. These different shapes may aid in mixing by creating disruption and turbulence in the flow of liquid during agitation, thereby accelerating the brewing process. The brew basket 203 may be comprised of one or more mesh structures to assist with filtration of the brewing ingredients. In some embodiments, the mesh structures may have an average mesh or pore size ranging from 0.040 to 0.120 mm in diameter, to prevent particles of brewing ingredients having a larger size from passing therethrough, yet still allowing liquid to freely pass therethrough, whether during agitation, or pouring of the liquid form the pitcher 202. Additionally, the brew basket 203 may contain mixing protrusions extending into the interior of the brew basket 203 for creating disruptions in flow, thereby increasing the agitation and extraction rate.

Notably, the agitator 209, agitator magnet holder 208*a*, and agitator magnets 208*b* are positioned entirely within the brew basket 203, and are movably connected to the cap 210. Although the agitator 209 is illustrated as generally cone-shaped, or generally pyramid-shaped, in other embodiments, the agitator 209 may have any number of shapes, including generally disc shaped, generally whisk shaped, or may contain at least one blade or vane.

Figure 4:
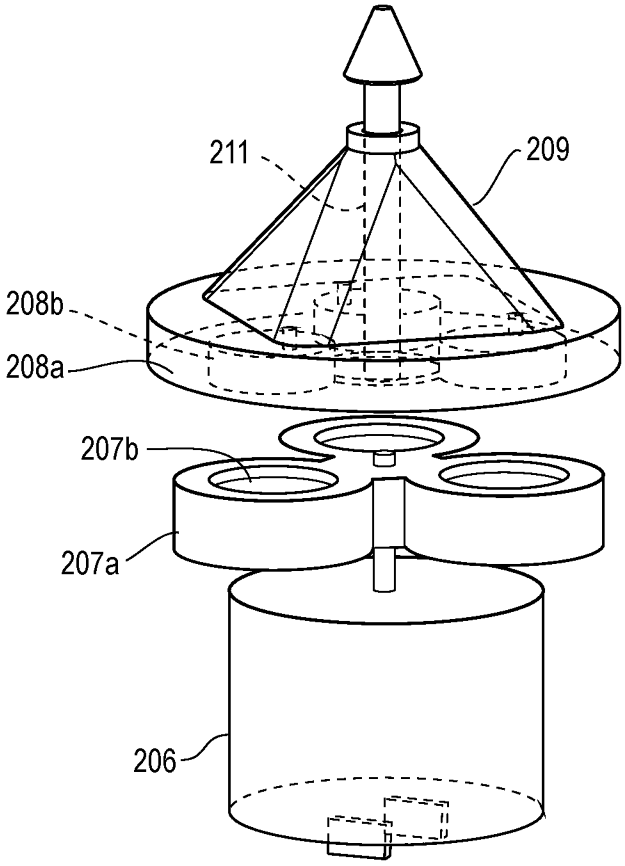
FIG. 4 is a perspective view of the motor and agitator from the liquid brewing device of FIG. 2A-B.

FIG. 4 is an illustration of a perspective view of the isolated motor and agitation mechanism of a liquid brewing device 200 according to the present disclosure. In general, the isolated motor and agitation mechanism includes a motor 206, a base magnet holder 207*a*, at least one base magnet 207*b* mounted therein, an agitator magnet holder 208*a*, at least one agitator magnet 208*b* mounted therein, and an agitator 209. The agitator 209 may be attached to the agitator magnet holder 208*a*, and may effectively enclose the agitator magnets 208*b*. The motor 206, base magnet holder 207*b*, and base magnets 207*b* are housed in the base 201. The agitator 209, agitator magnet holder 208*a*, and agitator magnets 208*b* are entirely positioned within the brew basket 203, and are rotatably connected to the lower cap 210.

In this embodiment, a central post 211 connects the agitator 209, agitator magnet holder 208*a*, and agitator magnets 208*b* to the cap 210. That is, the agitator 209, agitator magnet holder 208*a*, and agitator magnets 208*b* are rotatable relative to the central post 211, lower cap 210, and brew basket 203. It can be appreciated that, in other embodiments, the cap 210 may interact with the agitator 209 to keep the agitator magnet holder 208*a* and agitator 209 centered and aligned with respect to the base magnet holder 207*b* and the base magnets 207*b* mounted therein. For example, a protrusion on the cap 210 could be received in a matching geometrical shape or depression on the agitator magnet holder 208*a*, to allow the parts to connect and/or interface with one another.

Preferably, the agitator magnet(s) 208*b* should be located close to the base magnet(s) 207*b* when the brew basket 203 and cap 210 are inserted into the pitcher 202, and the pitcher 202 is placed on the base 201. Specifically, the agitator magnet(s) 208*b* are located in the bottom of the brew basket 203, while the base magnet(s) 207*b* are located near the surface of the base 201, where the pitcher 202 sits during use. In some embodiments, the agitator magnets and 208*b* and base magnets 207*b* are positioned apart 2.0 cm, or less, when the when the brew basket 203 and cap 210 are inserted into the pitcher 202, and the pitcher 202 is placed on the base 201. In some embodiments, the cap 210 will contact the base of the bottom of the pitcher when the brew basket 203 (with cap 220 mounted thereon) is interested into the pitcher 202.

Figure 5:
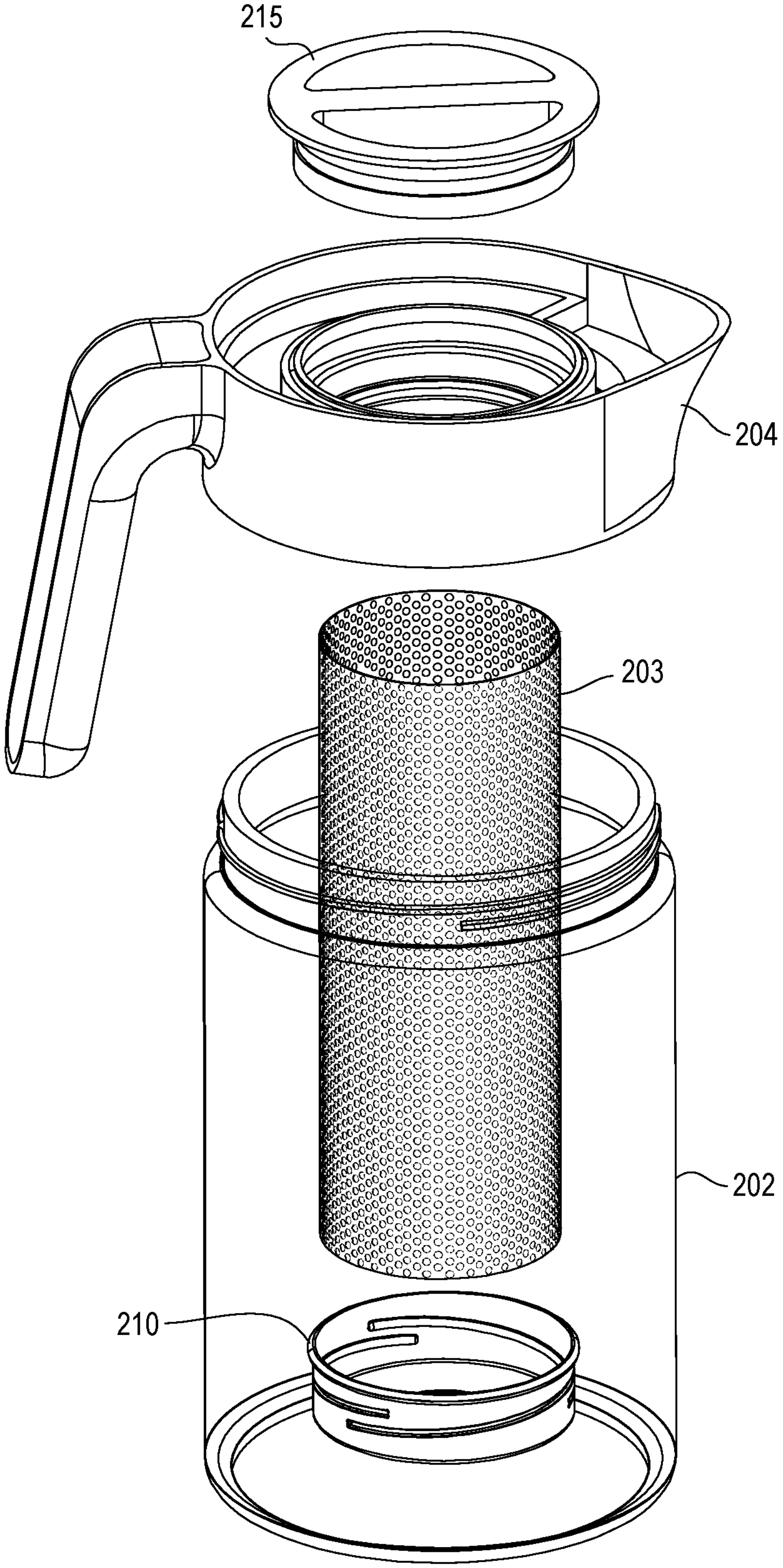
FIG. 5 is an exploded view of the brew basket, pitcher, lid, and cap of the liquid brewing device of FIG. 2A-B.

FIG. 5 is an illustration of a perspective, exploded view of the pitcher 202, brew basket 203, and lid 204 of a liquid brewing device 200 according to the present disclosure. In this embodiment, the cap 210 is seen inserted into the interior volume of the pitcher 202 and positioned at the bottom thereof. The cap 210 may include a mesh structure to assist with filtration. Additionally, the cap 210 may include at least one mesh-covered drainage port (not shown), such that liquid may drain through the drainage port when the brew basket is withdrawn from a liquid in the pitcher 202. As illustrated, the outlet 204*a* and handle may be separable from the pitcher 202. As illustrated, in one embodiment, the lid 204 may be separable from the handle and outlet 204*a* to assist with cleaning the individual parts.

As illustrated in the embodiment of FIGS. 2-5, the lid 204 may include a removable portion 215 separable from the lid 204. The removable portion 215 may be separate from or removably attached to the brew basket 203. In this regard, the removable portion 215 alone, or the removable portion 215 and the brew basket 203 together, may be withdrawn from the pitcher 202 to fill the brew basket 203 with brewing ingredients, prior to brewing, and/or to dispose of used brewing ingredients, following brewing, without having to remove the lid 204 from the pitcher 202, and without having to remove the pitcher 202, and any contents therein, from the base 202. The removable portion 215 may be removably connected to the lid 204 via any suitable method, including for example, a threaded connection, press-fit, snap fit, or the like. In some embodiments, the brew basket 203 may be removably connected to the removable portion 215 of the lid 204. In this regard, following withdrawal of the removable portion 215 and the brew basket 203 from the lid 204 and pitcher 203, the brew basket 203 may be removed from the removable portion 215, such that the removable portion 215 may be reconnected to the lid 204, without the brew basket 203, to contain contents in the pitcher 203. The brew basket 203 may be removably connected to the removable portion 215 of the lid 204 via any suitable method, including for example, a threaded connection, press-fit, snap fit, or the like.

Figure 6:
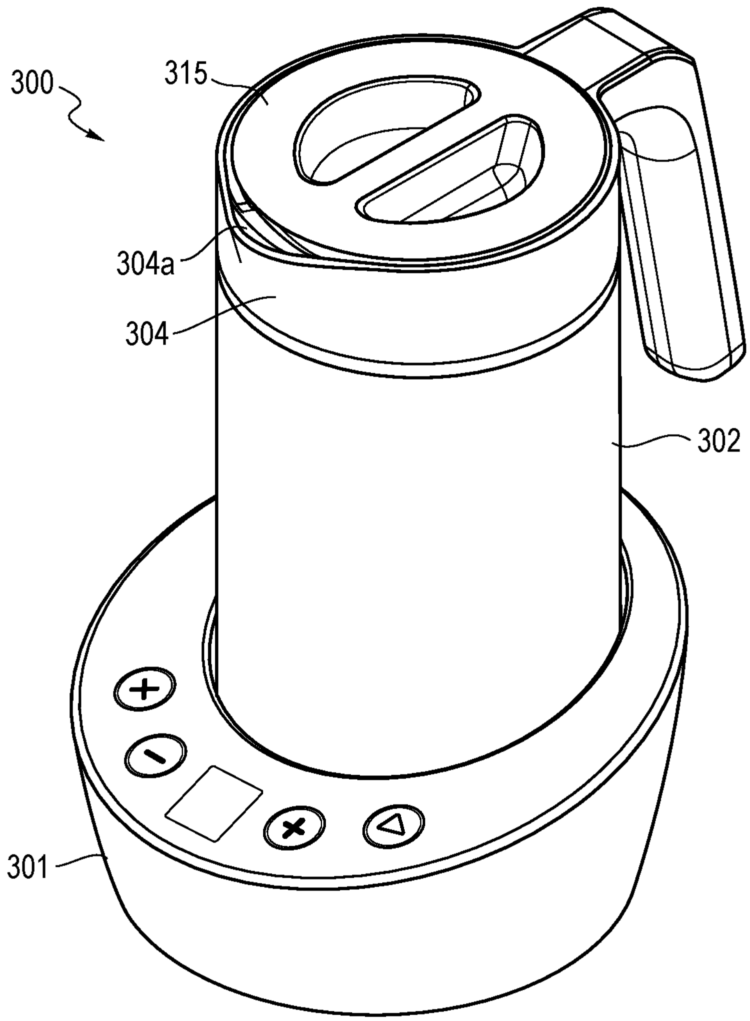
FIG. 6 is an illustration of another embodiment of a liquid brewing device according to the present disclosure.
Figure 7:
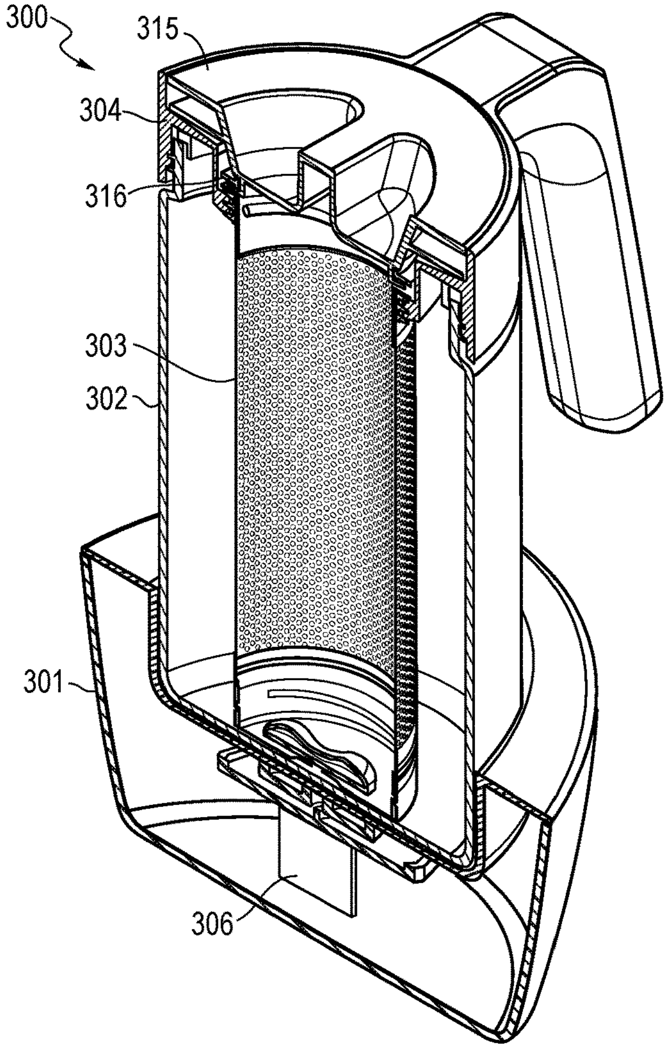
FIG. 7 is a cross-sectional view of the liquid brewing device of FIG. 6.
Figure 8:
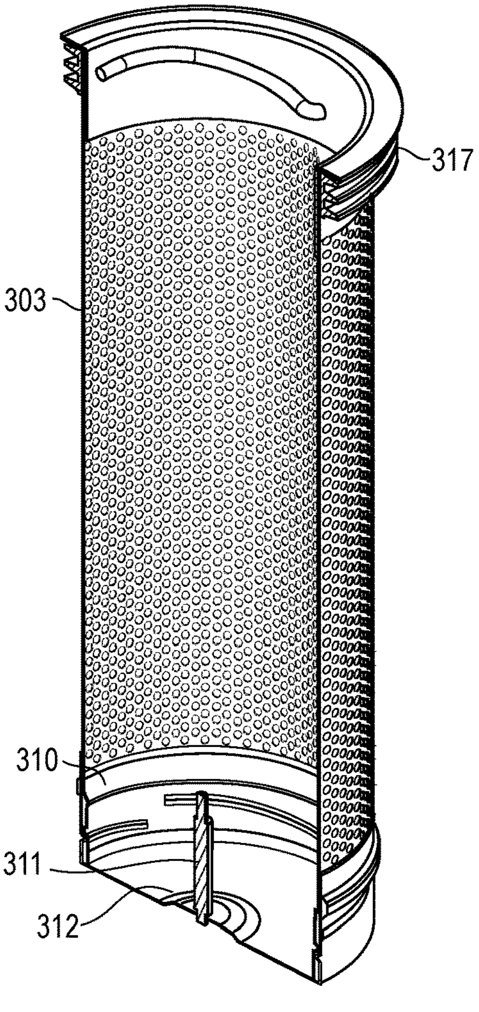
FIG. 8 is a cross-sectional view of the brew basket of the liquid brewing device of FIG. 6.

FIGS. 6-9 illustrate another embodiment of a liquid brewing device 300 according to the present disclosure. FIG. 6 is a perspective view of the liquid brewing device 300; FIG. 7 is a cross-sectional perspective view of the liquid brewing device of FIG. 6; and FIG. 8 is a cross-sectional perspective view of the brew basket 303 of FIG. 7.

Like the liquid brewing device 200, the liquid brewing device 300 comprises a base 301, a pitcher 302, a brew basket 303, and a lid 304 having an outlet, a motor 306, a base magnet holder 307*a*, at least one base magnet positioned therein (not shown), an agitator magnet holder 308*a*, at least one agitator magnet (not shown), an agitator 309, a lower cap 310 removably attached to the brew basket 303, and a central post 311 on which the agitator magnet holder 308*a* and agitator 309 are rotatably mounted.

Similar to the liquid brewing device 200, the liquid brewing device 300 includes a lid 304 having a removable portion 315 that is attached to the brew basket 303 and separable from the lid 304. In this regard, the removable portion 315 and the brew basket 303 may be withdrawn from the pitcher 302. In this embodiment, the removable portion 315 is sized and shaped to be press-fit into an opening in the lid 304 configured to receive the brew basket 303 and the removable portion 315 of the lid 304. The removable portion 315 of the lid 304 may include an annular wipe seal or gasket 316, formed of an elastic material, to aid in centering and stabilizing the brew basket 303 on with lid 304, and consequently the pitcher 302, thereby preventing it from wobbling or spinning relative to the lid 304 when the agitator 309 is driven by the motor 306. In other embodiments, the annular wipe seal or gasket 316 may be formed on the lid 304. In those embodiments, the wipe seal or gasket 316 may further prevent brewing ingredients contained in the brew basket 303 from entering the pitcher 302 during removal of the brew basket 303 through the lid 304, when the removable portion 315 is removed. As with the liquid brewing device 200, the brew basket 303 may be removably connected to the removable portion 315 of the lid 304 via any suitable method, including for example, a threaded connection, press-fit, snap fit, or the like.

In some embodiments, one or more annular seals 317 may be disposed about an upper end of the brew basket 303 to interface with the lid 304, to prevent any brewing ingredients within the brew basket 303 from exiting the brew basket 303 through the interface with the lid 204. Additionally, such annular seals may prevent the brew basket 303 from wobbling and/or spinning relative to the lid 304 when the agitator 309 is driven by the motor 306.

Figure 9A:
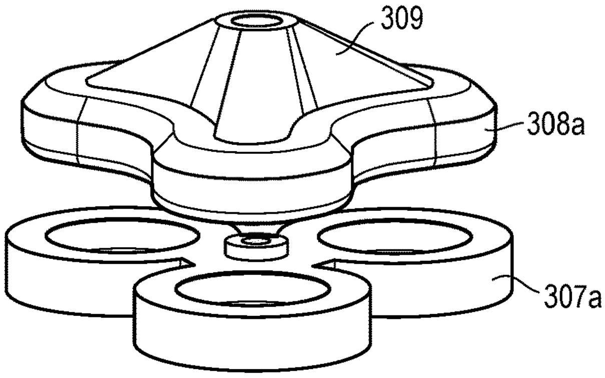
FIGS. 9A-9E are perspective and cross-sectional views of a base magnet holder, agitator magnet holder, and agitator of the liquid brewing device of FIG. 6.
Figure 9B:
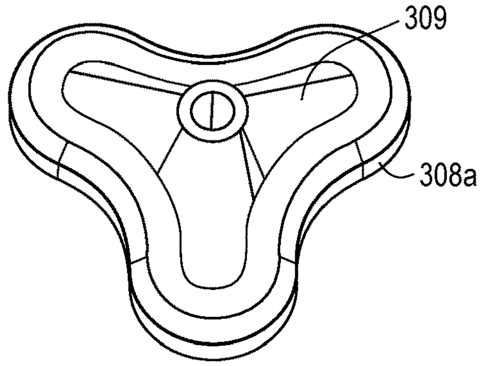
Figure 9C:
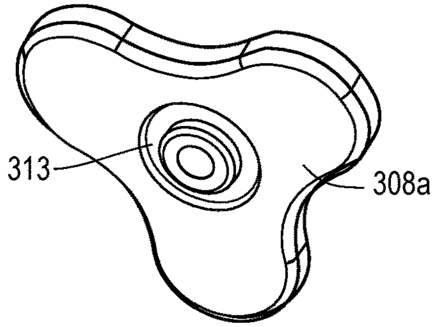
Figure 9D:
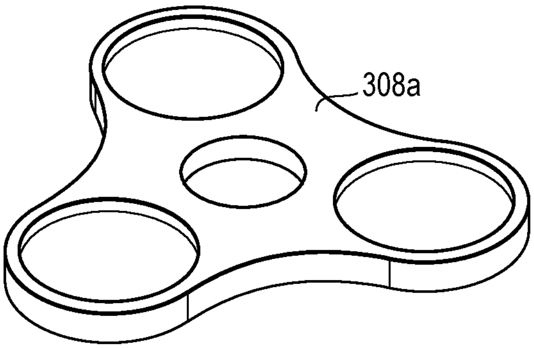
Figure 9E:
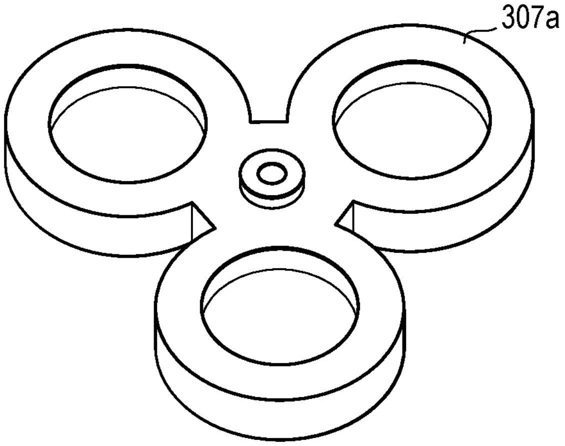

The liquid brewing device 300 differs from the liquid brewing device 200 at least in the design and construction of the base magnet holder 307*a*, base magnet holder 308*a*, and agitator 309. FIGS. 9A, 9B, 9C and 9E are perspective views of the base magnet holder 307*a*, agitator magnet holder 308*a*, and agitator 309, whereas FIG. 9D is a cross-sectional view of the agitator magnet holder 308*a*. In this embodiment, the base magnet holder 307*a* and the agitator magnet holder 308*a* both include three receptacles for receiving three magnets (not shown). The agitator 309 in this embodiment is generally shaped as a three-sided pyramid, where each face of the pyramid has a convex shape, or is inwardly depressed. Additionally, as illustrated in FIG. 9C, in this embodiment, a lower surface of the agitator magnet holder 308*a* further comprises an annular recess or grove 313 configured to receive a corresponding annular ring or protrusion 312 formed on the lower cap 310, as illustrated in FIG. 8. The annular recess or grove 313 and corresponding annular ring or protrusion 312 may used in addition to, or as a replacement for, the central post 311, to keep the agitator magnet holder 308*a* and agitator 309 centered and aligned within respect to the lower cap 310, and relative to the base magnet holder 307*b* and the base magnets mounted therein.

Figure 10A:
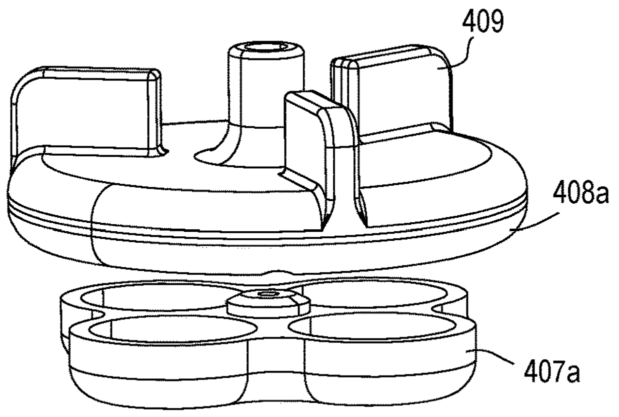
FIGS. 10A-E are perspective and cross-sectional views of an alternative base magnet holder, agitator magnet holder, and agitator, useable in any of the liquid brewing devices disclosed herein.
Figure 10B:
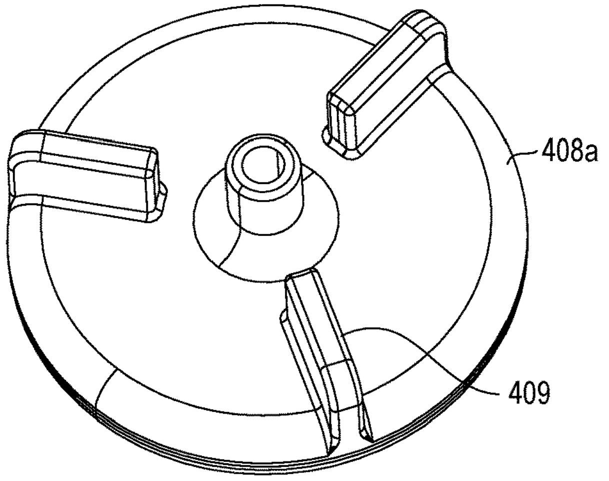
Figure 10C:
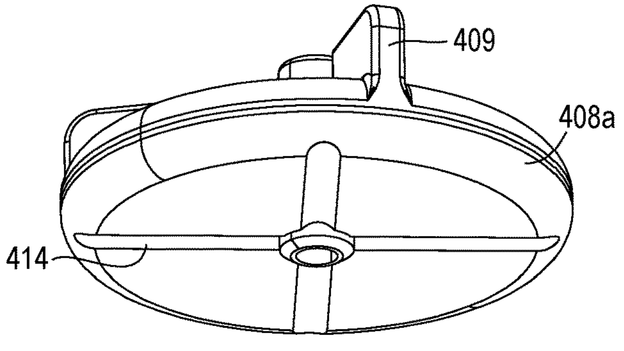
Figure 10D:
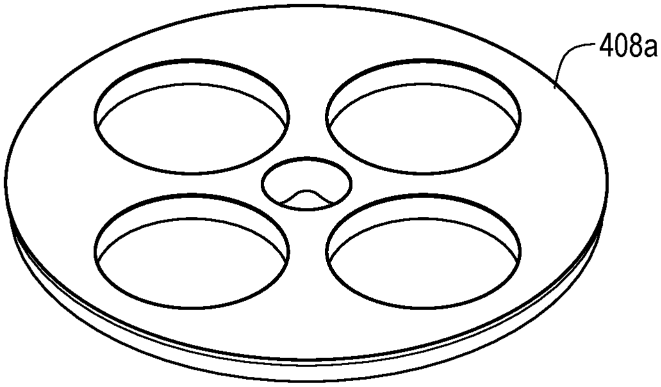
Figure 10E:
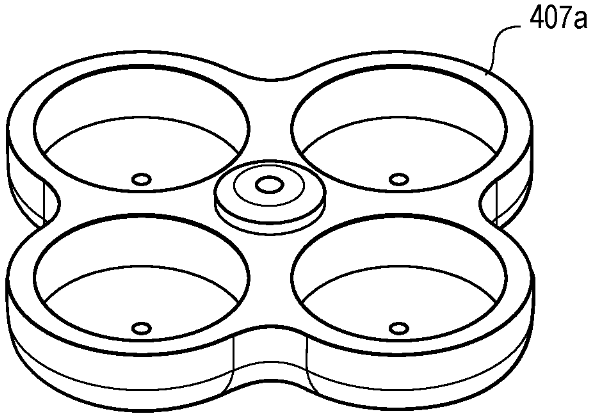

FIGS. 10A-E illustrate an alternative base magnet holder 407*a*, agitator magnet holder 408*a*, and agitator 409, useable in any of the liquid brewing devices disclosed herein. FIGS. 10A, 10B, 10C and 10E are perspective views of the base magnet holder 407*a*, agitator magnet holder 408*a*, and agitator 409, whereas FIG. 10D is a cross-sectional view of the agitator magnet holder 408*a*. In this embodiment, the base magnet holder 407*a* and the agitator magnet holder 408*a* both include four receptacles for receiving four magnets (not shown). The agitator 409 in this embodiment is generally constructed as three vanes or blades extending in a direction radially outward from a central axis of the agitator 409, where the vanes extend from an inner radius, spaced from the central axis, to an outer radius, at the outer edge of the agitator 409. Although the vanes or blades are illustrated as being generally planar, in some embodiments, the vanes or blades may be curved, to alter the mixing or agitation generated by rotation of the agitator 409. Additionally, in other embodiments, the vanes or blades may extend from the center axis to the outer edge of the agitator 409.

Notably, as shown in FIG. 10C, in this embodiment, a lower surface of the agitator magnet holder 408*a* includes at least one surface feature 414 configured to reduces resistance to rotation of the agitator magnet holder 408*a* and agitator 409, when disposed in a brew basket and pitcher placed on a base of the liquid brewing devices disclosed herein. When such surface features 414 are included on the lower surface of the agitator magnet holder 408*a*, the agitator magnet holder 408*a* and agitator 409 are able to accelerate quicker, and ultimately reach higher rotational speeds, without excessive turbulence, and/or rotation of the base magnet holder 407*a* relative to the agitator magnet holder 407*a*. Such surface features 414 are believed to help break up surface tension of the puck of liquid or slurry that forms between the agitator magnet holder 408*a* and the lower cap mounted on the brew basket. These features are also believed to create turbulence in the liquid under the agitator magnet holder 408*a*, thereby leading to less drag. As shown, the surface features 414 comprise a plurality of channels or grooves formed in the lower surface of the agitator magnet holder 408*a*, and extending from one side of the agitator magnet holder 408*a* to the other, through a center of the agitator magnet holder 408*a*. In other embodiments, the surface features 414 may comprise ribs or fins, and may extend in orientations other than as illustrated in FIG. 10C.

Figure 11A:
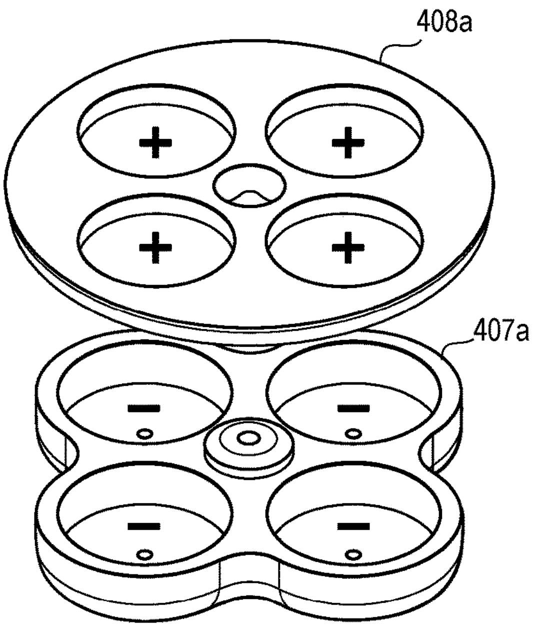
FIGS. 11A-C are cross-sectional views of the base magnet holder and agitator magnet holder of FIGS. 10A-E, illustrating potential polarity orientations of the base magnets and the agitator magnets, useable in any of the liquid brewing devices disclosed herein.
Figure 11B:
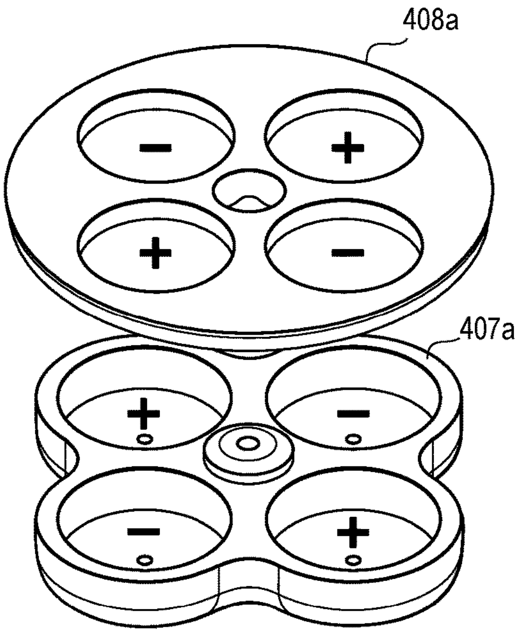
Figure 11C:
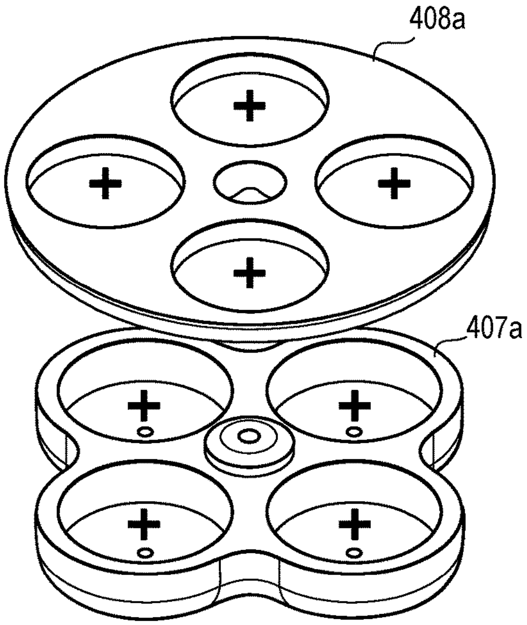

FIGS. 11A-C include a perspective view of the base magnet holder 407*a* and a cross-sectional perspective view of the agitator magnet holder 408*a*, illustrating exemplary polarity orientations of the base magnets (not shown) and the agitator magnets (not shown), useable in any of the liquid brewing devices disclosed herein. More specifically, FIG. 11A illustrates an embodiment where each of the base magnets positioned in the base magnet holder 407*a* is oriented with a first polarity opposite a second polarity of the agitator magnets positioned in the agitator magnet holder 408*a*. In this regard, each base magnet is magnetically attracted to a corresponding agitator magnet, such that rotation of the base magnet holder 407*a* by a motor results in corresponding rotation of the agitator magnet holder 408*a*, and thus, the agitator 409. In other words, the agitator magnet holder 408*a* and agitator 409 are "magnetically connected" or "magnetically coupled" to the base magnet holder 407*b*, even if separated by a small distance. As shown, negative polarity oriented base magnets are positioned in the base magnet holder 407*a*, while positive polarity oriented agitator magnets are positioned in the agitator magnet holder 408*a*. In other embodiments, positive polarity oriented base magnets may be positioned in the base magnet holder 407*a*, while negative polarity oriented agitator magnets may be positioned in the agitator magnet holder 408*a*. In these embodiments, the number negative polarity oriented base magnets in the base magnet holder 407*a* equals the number of positive polarity oriented agitator magnets in the agitator magnet holder 408*a*. Alternatively, the number of positive polarity oriented base magnets in the base magnet holder 407*a* equals the number of negative polarity oriented agitator magnets in the agitator magnet holder 408*a*. In these embodiments, the agitator magnet holder 408 and the base magnet holder 407*a* may rotate relative to one another, while maintaining magnetic attractions between respective agitator magnets and base magnets. As will be appreciated, the number of base magnets and the number of agitator magnets may be less than or greater than the number illustrated in FIG. 11A.

FIG. 11B illustrates another embodiment where each base magnet is magnetically attracted to a corresponding agitator magnet, but where the polarity orientations of the magnets positioned in the base magnet holder and in the agitator magnet holder alternate. That is, positive polarity oriented magnets are positioned adjacent to two negative polarity oriented magnets, and negative polarity oriented magnets are positioned adjacent to two positive polarity oriented magnets. In this embodiment, the number of negative polarity oriented base magnets in the base magnet holder 407*a* equals the number of positive polarity oriented agitator magnets in the agitator magnet holder 408*a*, while the number of positive polarity oriented base magnets in the base magnet holder 407*a* equals the number of negative polarity oriented agitator magnets in the agitator magnet holder 408*a*. In these embodiments, rotation of the agitator magnet holder 408*a* relative to the base magnet holder 407*a*, and visa versa, results in misaligned magnetic polarities, such that the base magnets in the base magnet holder 407*a* repel the agitator magnets in the agitator magnet holder 408*a*, thereby tending to limit or prevent rotation of the agitator magnet holder 408*a* and the base magnet holder 407*a* relative to one another. This configuration leads to a stronger "magnetic connection" between the agitator magnet holder 408*a* and the base magnet holder 407*a*, and thus, smoother rotation of the agitator magnet holder 408*a* and agitator 409 mounted thereon. More specifically, the magnet polarity orientations shown and described with reference to FIG. 11B are more tolerant of any misalignment between the axis of rotation of the base magnet holder 407*a* and the agitator magnet holder 408*a*, such that less noise (i.e, from vibrations, motor noise, frictional contact, etc.) is generated with this configuration, for example, as opposed to the configuration of FIG. 11A. Additionally, as compared to other configurations, in this configuration, any misalignment of the axis of rotation of the base magnet holder 407*a* and the agitator magnet holder 408*a* is less likely to lead to "magnetic disconnection" between the base magnet holder 407*a* and the agitator magnet holder 408*a* when based magnet holder 407*a* is rotated, especially at higher speeds, or when the brew basket 202 is heavily loaded with brewing ingredients. As will be appreciated, the number of base magnets and the number of agitator magnets may be less than or greater than the number illustrated in FIG. 11B. However, the total number of base magnets and the total number of agitator magnets is preferably an even number.

FIG. 11C, on the other hand, illustrates an embodiment where the polarity orientations of the base magnets positioned in the base magnet holder 407*a* have the same polarity orientations as the agitator magnets positioned in the agitator magnet holder 408*a*. As shown, the base magnets positioned in the base magnet holder 407*a* and the agitator magnets positioned in the agitator magnet holder 408*a* may be oriented relative to one another with positive polarities. In other embodiments, the matching polarities may be negative. In embodiments where the polarity orientations of the base magnets match the polarity orientations of the agitator magnets, like that shown in FIG. 11C, the orientation of the base magnet holder 407*a* relative to the agitator magnet holder 408*a* tends to be "offset," such that the base magnets are not aligned with the agitator magnets, like those shown in FIGS. 11A-B. Due to the repulsion between the base magnets and the agitator magnets in these embodiments, the relative position of the base magnet holder 407*a* and the agitator magnet holder 408*a* tends to maintain the orientation illustrated in FIG. 11C when the base magnet holder 407*a* is rotated by a motor. As will be appreciated, the number of base magnets and the number of agitator magnets may be less than or greater than the number illustrated in FIG. 11C.

In a preferred embodiment, the liquid brewing device 300 utilizes the design and construction of the base magnet holder 407*a*, agitator magnet holder 408*a*, and agitator 409 of FIGS. 10A-10E, and the magnet polarity orientations illustrated and described with reference to FIG. 11B. More specifically, an objective of the present disclosure is to provide a liquid brewing device with an agitator that, when rotated, interfaces with liquid to generate a strong stirring or mixing action, while not requiring transmission of too much torque from the motor and base magnet holder 407*a*, such that the agitator magnet holder 408*a* loses "magnetic connection" with the base magnet holder 407*a*. This objective is achieved at least partially through provision of: 1) the agitator 409, having three vanes or blades extending in a direction radially outward from a central axis of the agitator 409, where the vanes extend from an inner radius, spaced from the central axis, to an outer radius, at the outer edge of the agitator 409 (see FIGS. 10A-B); 2) the surface features 414 formed on the lower surface of the agitator magnet holder 408*a* (see FIG. 10C); and, 3) the magnet polarity orientations shown and described with reference to FIG. 11B.

In a preferred embodiment, the agitator magnet holder and agitator are constructed of a lightweight (preferably lubricous) plastic, while the lower cap is constructed of a thin metal, like stainless steel. In this regard, any contact between the agitator magnet holder and the lower cap will result in minimal friction. Additionally, the lower cap does not generate buoyancy (as compared to a plastic), that would result in an upward force on the brew basket. Moreover, the thin cap permits the agitator magnets positioned in the agitator magnet holder to be positioned closer to the base magnets, as compared to a thicker cap.

One beneficial use of the brewing devices 200, 300 described herein involves the ability for the user to calibrate the extraction level of the liquid brew during use. Following an initial brewing period, the user is able to remove the pitcher 202, 303 from the base 201, 301 while the brew basket 203, 303 and agitator 209, 309, 409 remain undisturbed in the pitcher 202, 302. The user can then observe the optical saturation level through the pitcher 202, 302 or pour a sample of the liquid out of the pitcher 202, 302 and taste for preference. If the user prefers a stronger liquid extract, he or she may place the pitcher 202, 302 back onto the base 201, 301 and resume agitation, without accessing the interior volume of the pitcher 202, 303. This can be done as many times as necessary to achieve optimal extraction, without having to disturb the inner-workings of the liquid brewer, which could cause a mess, or involve a significant time expenditure.

An additional beneficial use of the brewing devices 200, 300 is that the brewed liquid flows freely out of the brew basket 203, 303 into the interior volume of the pitcher 202, 302 and out of the outlet 204*a*, 304*a* without having to manipulate the brew basket 203, 303 or agitator 209, 309, 409 contained therein.

Yet another additionally beneficial use of the brewing devices 200, 300 is that ice may be placed in the pitcher 202, 302, in the space between the brew basket 203, 303, and the pitcher 202, 302, without impacting or impeding rotation of the agitator magnet holder 408*a* and agitator 409, positioned inside the brew basket 203, 303, and without disrupting the stirring or agitation of the liquid occurring within the brew basket 203, 303. In this regard, a user is able to chill the brewed liquid without disrupting the brewing process.

A further beneficial use of the brewing devices 200, 300 is that, following brewing, a user may remove the pitcher 202, 302 from the base, separate the removeable portion 215, 315 from the lid 204, 304, withdraw the brew basket 203, 303 from the pitcher 202, 302, and then return the removeable portion 215, 315 to the lid 204, 304, allowing immediate use of the brewed liquid in the pitcher 202, 302, and/or placement of the pitcher 202, 302 in a refrigerator. Meanwhile, the user may dispose of the spent brewing ingredients contained in the brew basket 203, 303, and may separate the agitator 209, 309, 409 from the brew basket 203, 303 for cleaning.

Figures 12, 13:
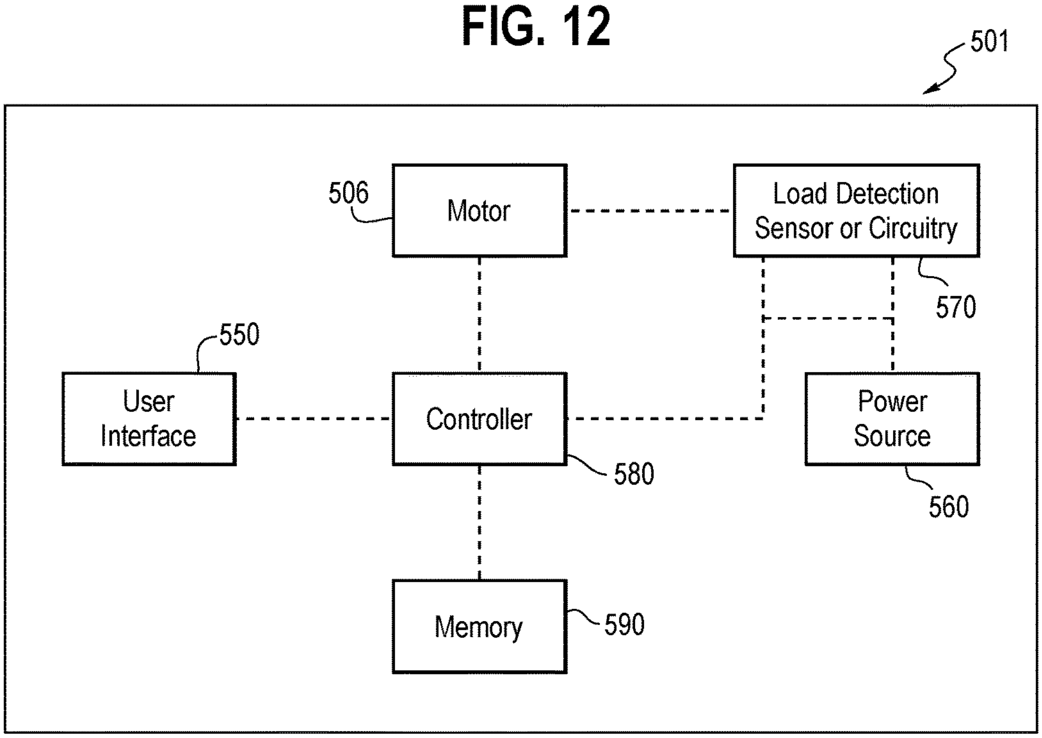
FIG. 12 is a functional block diagram of the components that may be housed within the bases of the liquid brewing devices disclosed herein; and, FIG. 13 is a table illustrating an exemplary brewing program according to an embodiment of the present disclosure.

In any of the embodiments described herein, a base 501 (or bases 205, 305) may house a motor 506 (or motors 206, 306) in communication with a user interface 550, a power source 560, a motor load detection sensor or circuitry 570, a controller 580, and a memory 590, as illustrated in the functional block diagram of FIG. 12. As previously described, the motor 506 may be any suitable AC or DC motor, and the power source 560 may be a standard electric cord connected to a wall outlet, or a battery. The user interface 550 may include one or more buttons, dials and/or controls for setting brew time, motor speed, and/or one or more specific brewing programs or sequences stored in the memory 590, for execution by the controller 580. The user interface 550 may also include a display for displaying brew time, motor speed, and/or aspects of the brewing programs or sequences. The controller 580 may be any suitable microcontroller, processor, CPU, etc., for interfacing with and controlling the user interface 550, motor 506, load detection sensor or circuitry 570, and memory 590. The memory may include any suitable form of memory, for example, random access memory, for storing firmware and/or one or more brewing programs, or sequences, to be executed by the controller 580. The load detection sensor or circuitry 570 may be any suitable sensor or circuitry to detect or sense the load on the motor 506, for example, via current draw and/or motor speed.

In some embodiments, the load detection sensor or circuitry 570 may be utilized to detect or sense the load on the motor 506 during operation, which may vary, for example, depending on: 1) placement of the pitcher on or off the base; 2) the volume of liquid contained in a pitcher placed on the base; 3) the volume of brewing ingredients contained in the brew basket inserted therein; 4) the viscosity of the brewed liquid; and/or, 5) other resistance to the rotation of the agitator, and therefore the motor, for example, due to "clumping" of the brewing ingredients around the agitator and/or clogging of the mesh structure of the brew basket. The controller 580 may increase or decrease motor power or speed based on the load on the motor 506 detected by the load detection sensor or circuitry 570. For example, if the controller 580, in conjunction with the load detection sensor or circuitry 570, determines that the load on the motor is high, potentially due to blockage or resistance to rotation of the agitator, the controller may increase the power to the motor 506. In addition, the controller 580 may provide an error indication to the user via the user interface 550 if the load detection sensor or circuitry 570 detects a load on the motor 506 in excess of a threshold amount, and/or determines that there is no load on the motor, for example, when the pitcher is not placed on the base, or is placed on the base without the brew basket and/or agitator inserted therein. If the controller 580 determines via the load detection sensor or circuitry 570 that there is no load on the motor 506, the controller 580 may temporarily or permanently stop the supply of power to the motor 506.

As compared to a passive cold brewing processes, where brewing ingredients simply steep in a liquid over an extended period of time, followed by filtration, the liquid brewing devices disclosed herein utilize active brewing processes, where the brewing ingredients are continuously and/or periodically agitated, then filtered, as described above. It is an object of the present disclosure to utilize the liquid brewing devices disclosed herein to obtain brewed liquids comparable to or the same as brewed liquids utilizing strictly passive cold brewing processes, including in both appearance and taste. In order to achieve such objective, in some embodiments, the liquid brewing devices disclosed herein are operated in a manner consistent with active cold brewing processes, while at the same time, limiting the amount and intensity of agitation, to thereby reduce the breakdown of liquid brewing ingredients to a size small enough to permit undesirable passage through the mesh structure of the brew baskets containing the brewing ingredients, which can negatively affecting the quality of the brewed liquid. In this regard, rather than continuously running the motors of the liquid brewing devices disclosed herein at some predetermined power and/or speed for some fixed length of time, or indefinitely, the liquid brewing devices may be tuned and programmed to perform liquid brewing programs according to specific liquid brewing ingredients (e.g. coffee grounds having specific average ground sizes, loose leaf teas, powders, etc.), user preferences (e.g., flavor intensity levels, optical saturation, etc.), desired brewing times (e.g., ranging from 60 seconds to 60 minutes, or more), and/or any combinations thereof. These liquid brewing programs may have one or more phases, including both active phases, where an agitator is rotating, and inactive phases, where the agitator is not rotating, or rotating at significantly reduced speeds.

For example, in response to selection of a brewing program stored in the memory 590 by a user via the user interface 550, the controller 580 may execute the brewing program, causing the motor 506 to run at a predetermined power or speed, for a predetermined period of time, thereby rotating the agitator (e.g., agitator 209, 309, 409) to "mix and wet" the brewing ingredients in the liquid contained in the corresponding pitcher, and initiate flavor extraction from the brewing ingredients. In order to prevent excessive agitation, motor power or speed may be set at a threshold below maximum motor power or speed, and monitored by the load detection sensor or circuitry 570. Additionally, total agitation time may be set to achieve desired extraction, and yet prevent the breakdown of liquid brewing ingredients to a size small enough to permit undesirable passage through the mesh structure of the brew baskets containing the brewing ingredients. Depending on the program selected, brewing may conclude after the predetermined period of time, or may include a second inactive phase, where the motor and agitator are not rotating, or rotating at significantly reduced speeds. In this "dwell and soak phase," following the initial mixing and wetting of the brewing ingredients, flavor extraction may continue for some additional predetermined amount of time, or indefinitely, until the user is ready to consume the liquid brew. In any event, the length of each phase (active and inactive) may be adjusted according to the total desired brewing time.

Optionally, the brewing program may include one or more additional phases, including both active phases, where an agitator is rotating, and inactive phases, where the agitator is not rotating. For example, in order to promote more thorough mixing of the brewing ingredients following the initial phases described above, the controller may cause the motor to again run at a predetermined power or speed, for a predetermined period of time, thereby rotating the agitator (e.g., agitator 209, 309, 409) to further mix and wet the brewing ingredients in the liquid contained in the corresponding pitcher, and continue flavor extraction from the brewing ingredients. In this phase, the predetermined power or speed may be the same as, greater than, or less than the prior phase intended to mix and wet the brewing ingredients. Likewise, in this phase, the predetermined period of time may be the same as, greater than, or less than the prior phase intended to mix and wet the brewing ingredients. In some embodiments, the motor power or speed will be less in this phase than in prior active phases, while the predetermined period of time will be the same. Depending on the program selected, brewing may conclude after this additional predetermined period of time, or may include a yet another inactive phase, where the motor and agitator are not rotating, or rotating at significantly reduced speeds. In this additional dwell and soak phase, flavor extraction may continue for some additional predetermined amount of time, or indefinitely, until the user is ready to consume the liquid brew. In any event, the length of each phase (active and inactive) may be adjusted according to the total desired brewing time.

Optionally, in some embodiments, the brewing program may further include one or more additional phases, including both active phases, where an agitator is rotating, intended to further mix and wet the brewing ingredients, and inactive dwell and soak phases, where the agitator is not rotating, or rotating at significantly reduced speeds, intended to continue flavor extraction from the brewing ingredients.

Optionally, in some embodiments, and especially those having longer total brewing times, where through mixing and wetting of the brewing ingredients is achieved in initial phases of the brewing program, the program may further include one or more additional phases, including both active phases, where an agitator is rotating to reconstitute the mixture (e.g., after settling has occurred), and inactive dwell and soak phases, where the agitator is not rotating, or rotating at significantly reduced speeds, intended to continue flavor extraction from the brewing ingredients.

Optionally, in some embodiments, during the "dwell and soak" phases described above, motor power or speed may be set at some non-zero level less than the motor power or speed set during the active phases, thereby continuing some level of mixing, and preventing settling of the brewing ingredients, but limiting the amount and intensity of agitation, to thereby reduce the breakdown of liquid brewing ingredients to a size small enough to permit undesirable passage through the mesh structure of the brew baskets containing the brewing ingredients.

In addition to obtaining brewed liquids comparable to or the same as brewed liquids utilizing strictly passive cold brewing processes, the aforementioned brewing programs also beneficially reduce power consumption of the liquid brewing devices by periodically and intermittently cycling the motor on and off, and/or between higher and lower power levels.

FIG. 13 is a table illustrating an exemplary multi-phase brewing program according to an embodiment of the present disclosure. It will be appreciated that the exemplary brewing program described below could have less than the number of illustrated phases, or more, and that the described variables (motor power or speed, phase run times, and total run time) could be modified, without departing from the scope of following description.

In general, at step 601, phase 1 of the brewing program begins by running the motor 506 (or motors 206, 306) at a predetermined power or speed, for a predetermined 5 second period of time, thereby rotating the agitator (e.g., agitator 209, 309, 409) to initiate mixing and wetting of the brewing ingredients in the liquid contained in the corresponding pitcher, and initiate flavor extraction from the brewing ingredients. During this phase, the load detection sensor or circuitry 570, in conjunction with the controller 580, determines the load on the motor 506, and sets that value as x. In this way, the liquid brewing device may account for variables relating to volume and type of liquid in the pitcher and/or volume and type of liquid brewing ingredients contained in the brew basket. The run time of this phase may be greater or less than 5 seconds, and may be adjusted as necessary depending on overall brewing time.

At step 602, during phase 2 of the brewing program, the motor is shut off for 20 seconds, during which flavor extraction may continue. The run time of this phase may be greater or less than 20 seconds, and may be adjusted as necessary depending on overall brewing time.

At step 603, during phase 3 of the brewing program, the motor is run at 75% of the original predetermined power or speed (e.g. 0.75×), for a predetermined 5 second period of time, thereby rotating the agitator (e.g., agitator 209, 309, 409) to continue mixing and wetting of the brewing ingredients in the liquid contained in the corresponding pitcher, and continue further flavor extraction from the brewing ingredients. The power or speed of the motor may be greater or less than 75%, and the run time of this phase may be greater or less than 5 seconds, adjusted as necessary depending on overall brewing time. The run time of phase 3 need not be the same length of the run time of as phase 1.

At step 604, during phase 4 of the brewing program, the motor is shut off for 20 seconds, during which flavor extraction may continue. The run time of this phase may be greater or less than 20 seconds, and may be adjusted as necessary depending on overall brewing time. The run time of phase 4 need not be the same length of the run time of as phase 2.

At step 605, during phase 5 of the brewing program, the motor is again run at 75% of the original predetermined power or speed (e.g. 0.75×), for a predetermined 5 second period of time, thereby rotating the agitator (e.g., agitator 209, 309, 409) to continue mixing and wetting of the brewing ingredients in the liquid contained in the corresponding pitcher, and continue further flavor extraction from the brewing ingredients. The power or speed of the motor may be greater or less than 75%, and the run time of this phase may be greater or less than 5 seconds, adjusted as necessary depending on overall brewing time. The run time of phase 5 need not be the same lengths as the run times of as phases 1 and 3.

At step 606, during phase 6 of the brewing program, the motor is shut off for a longer period of 49 seconds, as compared to the prior dwell and soak periods, during which flavor extraction may continue. The run time of this phase may be greater or less than 49 seconds, and may be adjusted as necessary depending on overall brewing time.

At step 607, during phase 7 of the brewing program, the motor is run at a reduced 40% level of the original predetermined power or speed (e.g. 0.40×), for a predetermined 11 second period of time, thereby rotating the agitator (e.g., agitator 209, 309, 409) to reconstitute the mixture of the brewing ingredients in the liquid contained in the corresponding pitcher, and continue further flavor extraction from the brewing ingredients. The power or speed of the motor may be greater or less than 40%, and the run time of this phase may be greater or less than 11 seconds, adjusted as necessary depending on overall brewing time.

For the remainder of the brewing program, step 606 and step 607 may be repeated to let the mixture dwell and soak, followed by periodic reconstitution of the mixture, thus continuing further flavor extraction. As with prior phases, the power or speed of the motor during reconstitution of the mixtures may be less than or greater than 40% of the original predetermined power or speed (e.g. 0.40×), and the run times of these phases may be greater or less than 49 seconds and 11 seconds, respectively. Additionally, the repeated dwell and soak and reconstitution phases need not be the same lengths from one repeated phase to the next.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

The invention claimed is:

1. A liquid brewing device comprising:

a base housing a motor and at least one base magnet rotatable by the motor relative to the base;

a pitcher having an interior volume;

a brew basket for receiving brewing ingredients, the brew basket being removably insertable positioned in the interior volume of the pitcher;

an agitator positioned entirely within and rotatable relative to the brew basket, the agitator operatively coupled to at least one agitator magnet; and, a cap removably connected to a lower end of the brew basket, the agitator rotatably mounted to the cap;

wherein the at least one agitator magnet is magnetically coupled to the at least one base magnet, such that rotation of the at least one base magnet by the motor operates to rotate the at least one agitator magnet and the agitator.

2. The liquid brewing device of claim 1, wherein when the brew basket is positioned in the interior volume of the pitcher, the cap is in contact with a lower surface of the pitcher.

3. The liquid brewing device of claim 1, wherein the base comprises an upper surface configured to receive a lower surface of the pitcher.

4. The liquid brewing device of claim 1, wherein the pitcher comprises an outlet for pouring liquid from the interior volume, the outlet being positioned outside the brew basket, such that brewing ingredients remain in the brew basket when liquid is poured from the interior volume through the outlet.

5. The liquid brewing device of claim 1, wherein the at least one base magnet comprises at least one base magnet having a first polarity orientation and at least one base magnet having a second polarity orientation opposite the first polarity orientation, and wherein the at least one agitator magnet comprises at least one agitator magnet having the first polarity orientation and at least one agitator magnet having the second polarity orientation.

6. The liquid brewing device of claim 1, wherein the at least one agitator magnet is positioned entirely within the brew basket.

7. The liquid brewing device of claim 1, further comprising a lid removably connectable to the pitcher, the lid having a removable lid portion, wherein the removeable lid portion and the brew basket are separable from the lid.

8. The liquid brewing device of claim 7, wherein the brew basket is removably connectable to the removeable lid portion.

9. The liquid brewing device of claim 1, wherein an inner surface of the brew basket comprises mixing protrusions extending into an interior of the brew basket.

10. The liquid brewing device of claim 1, wherein the cap includes at least one drainage port.

11. The liquid brewing device of claim 1, wherein the cap includes a mesh structure.

12. The liquid brewing device of claim 1, wherein the cap includes a post on which the agitator is rotatably mounted.

13. The liquid brewing device of claim 1, wherein the cap and the agitator have mating geometrical shapes to connect the cap and the agitator.

14. A liquid brewing device comprising:

a base housing a motor and a plurality of base magnets rotatable by the motor relative to the base;

a pitcher having an interior volume;

a brew basket for receiving brewing ingredients, the brew basket comprising a mesh structure and being positioned in the interior volume of the pitcher;

an agitator positioned within and rotatable relative to the brew basket, the agitator operatively coupled to a plurality of agitator magnets; and, a cap removably connected to a lower end of the brew basket;

wherein the plurality of agitator magnets are coupled to the plurality of base magnets, such that rotation of the plurality of base magnets by the motor operates to rotate the plurality of agitator magnets and the agitator.

15. The liquid brewing device of claim 14, wherein when the brew basket is inserted in the interior volume of the pitcher, the cap is in contact with a lower surface of the pitcher.

16. The liquid brewing device of claim 14, wherein the base comprises an upper surface configured to receive a lower surface of the pitcher.

17. The liquid brewing device of claim 14, wherein the pitcher comprises an outlet for pouring liquid from the interior volume, the outlet being positioned outside the brew basket, such that brewing ingredients remain in the brew basket when liquid is poured from the interior volume through the outlet.

18. The liquid brewing device of claim 14, wherein the plurality of base magnets comprise at least one base magnet having a first polarity orientation and at least one base magnet having a second polarity orientation opposite the first polarity orientation, and wherein the plurality of agitator magnets comprise at least one agitator magnet having the first polarity orientation and at least one agitator magnet having the second polarity orientation.

19. The liquid brewing device of claim 14, wherein the agitator and the plurality of agitator magnets are positioned entirely within the brew basket.

* * * * *